United States Patent
Jung

(10) Patent No.: US 9,706,099 B2
(45) Date of Patent: Jul. 11, 2017

(54) CAMERA MODULE AND CAMERA APPARATUS HAVING THE SAME

(71) Applicant: LG INNOTEK CO., LTD., Seoul (KR)

(72) Inventor: Ki Seok Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/651,430

(22) PCT Filed: Dec. 11, 2013

(86) PCT No.: PCT/KR2013/011472
§ 371 (c)(1),
(2) Date: Jun. 11, 2015

(87) PCT Pub. No.: WO2014/092452
PCT Pub. Date: Jun. 19, 2014

(65) Prior Publication Data
US 2015/0319348 A1    Nov. 5, 2015

(30) Foreign Application Priority Data

Dec. 14, 2012 (KR) ........................ 10-2012-0146955

(51) Int. Cl.
*H04N 5/225* (2006.01)
*G03B 17/12* (2006.01)

(52) U.S. Cl.
CPC ........... *H04N 5/2257* (2013.01); *G03B 17/12* (2013.01)

(58) Field of Classification Search
None
See application file for complete search history.

(56) References Cited

U.S. PATENT DOCUMENTS

| | | | |
|---|---|---|---|
| 2004/0223072 A1 | 11/2004 | Maeda et al. | |
| 2006/0042064 A1* | 3/2006 | Montfort | H04N 5/2253 29/407.1 |
| 2007/0077049 A1* | 4/2007 | Tsai | H04N 5/2257 396/91 |
| 2008/0239072 A1* | 10/2008 | Cheng | G08B 13/19619 348/143 |

(Continued)

FOREIGN PATENT DOCUMENTS

| | | |
|---|---|---|
| JP | 2000-270245 A | 9/2000 |
| JP | 2010-045446 A | 2/2010 |
| KR | 10-2004-0095732 A | 11/2004 |
| KR | 10-0673643 B1 | 1/2007 |
| KR | 10-2009-0051901 A | 5/2009 |
| KR | 10-2011-0097275 A | 8/2011 |

OTHER PUBLICATIONS

International Search Report in International Application No. PCT/KR2013/011472, filed Dec. 11, 2013.

(Continued)

*Primary Examiner* — Shahbaz Nazrul
(74) *Attorney, Agent, or Firm* — Saliwanchik, Lloyd & Eisenschenk

(57) ABSTRACT

Disclosed is a camera module and a camera apparatus having the same. The camera apparatus includes: a substrate; and a camera module passing through the substrate, and including a lens disposed forward of the substrate and a sensor unit disposed rearward of the substrate. An optical axis is not bent in the camera apparatus so that the accuracy of an image signal is improved.

10 Claims, 3 Drawing Sheets

(56) References Cited

U.S. PATENT DOCUMENTS

| | | | |
|---|---|---|---|
| 2009/0109328 A1* | 4/2009 | Moon | H04N 5/2252 348/374 |
| 2010/0073555 A1* | 3/2010 | Li | H04N 5/2252 348/376 |
| 2010/0245565 A1* | 9/2010 | Bae | G01N 35/00069 348/135 |
| 2011/0058099 A1* | 3/2011 | Lai | H04N 5/2251 348/373 |
| 2011/0063498 A1* | 3/2011 | An | H04N 5/2252 348/375 |
| 2011/0223969 A1* | 9/2011 | Chou | G03B 11/00 455/556.1 |
| 2012/0050837 A1* | 3/2012 | Guo | G02F 1/167 359/228 |
| 2013/0155311 A1* | 6/2013 | Grandin | H04N 5/2257 348/335 |
| 2013/0222686 A1* | 8/2013 | Baek | H05K 1/182 348/374 |
| 2013/0229571 A1* | 9/2013 | Martinez | H04N 5/2254 348/374 |

OTHER PUBLICATIONS

Office Action dated Sep. 22, 2014 in Korean Application No. 10-2012-0146955.

\* cited by examiner

CAMERA MODULE AND CAMERA APPARATUS HAVING THE SAME

CROSS-REFERENCE TO RELATED APPLICATIONS

This application is the U.S. national stage application of International Patent Application No. PCT/KR2013/011472, filed Dec. 11, 2013, which claims priority to Korean Application No. 10-2012-0146955, filed Dec. 14, 2012, the disclosures of each of which are incorporated herein by reference in their entirety.

TECHNICAL FIELD

The embodiment relates to a camera apparatus, and more particularly, to a camera module and a camera apparatus having the same.

BACKGROUND ART

Generally, a camera module has been installed in a mobile communication terminal, an information technology (IT) device, such as a PDA or an MP3 player, a vehicle, and an endoscope. As the technology has been developed toward the high-pixel camera module from the conventional VGA camera equipped with 0.3 mega pixels, the camera module has been manufactured in a small size with a slim structure according to targets to which the camera module is installed. In addition, the camera module has been equipped with various additional functions, such as auto-focusing or optical zoom functions, at the low manufacturing cost.

The above camera apparatus includes a lens barrel to include a lens, a lens holder coupled with the lens barrel, an image sensor disposed in the lens holder, and a substrate on which the image sensor unit. In this case, the lens transfers an image signal of a subject to an image sensor. Further, the image sensor converts an image signal into an electric signal. Accuracy of an image signal is determined in the camera apparatus according to a focal length defined as a distance between the lens and the image sensor.

However, the substrate is bent in the camera apparatus as described above. That is, a plurality of components as well as the image sensor are mounted on the substrate so that the substrate is bent. Accordingly, an optical axis (OA) to connect a center of the lens to a center of the image sensor is bent in the camera apparatus. Accordingly, an amount of light reaching each region of the sensor unit is not uniform so that a vignetting phenomenon occurs in the camera apparatus.

Further, in order to apply a light emitting part to the camera apparatus, a sub-substrate where a light emitting part is mounted at a peripheral region of a lens barrel must be installed. This is for the purpose of ensuring an angle of view of the light emitting part. Accordingly, when the camera apparatus is manufactured, a high cost is required due to the sub-substrate. This increases a cost of the camera apparatus.

DISCLOSURE OF INVENTION

Technical Problem

The embodiment provides a camera apparatus capable of improving accuracy of an image signal in order to prevent an optical axis from being bent in the camera apparatus. The embodiment provides a camera apparatus capable of preventing a vignetting phenomenon.

The embodiment provides a camera apparatus manufactured at a low cost. That is, the embodiment provides a camera apparatus capable of reducing the manufacturing cost.

Solution to Problem

According to the embodiment, there is provided a camera apparatus including: a substrate; and a camera module passing through the substrate, and comprising a lens disposed forward of the substrate and a sensor unit disposed rearward of the substrate.

The camera module may include: a lens barrel to include the lens; and a lens holder coupled with the lens barrel. At least a part of the lens barrel may be disposed forward of the substrate.

The substrate may include a hole and the camera module passes through the hole.

The camera apparatus may further include a light emitting part mounted at a front surface of the substrate to generate light. The light emitting part may surround the lens barrel. The light emitting part may generate infrared ray.

A distance between the lens and the sensor unit may be a focal length extending through the substrate.

According to the embodiment, there is provided a camera module including: a lens barrel disposed forward of a substrate to include a lens; a lens holder coupled with the lens barrel and disposed rearward of the substrate; and a sensor unit accepted in the lens holder.

The lens module may extend through the substrate by passing through a hole formed in the substrate.

At least a part of the lens barrel may be disposed forward of the substrate.

The camera module may further include a light emitting part mounted at a front surface of the substrate to generate light. The light emitting part may surround the lens barrel. The light emitting part may generate infrared ray.

A distance between the lens and the sensor unit may be a focal length extending through the substrate.

Advantageous Effects of Invention

In the camera module and the camera apparatus including the same according to the embodiment, the sensor unit is disposed independently from the substrate so that an optical axis is prevented from being bent. That is, even if the substrate is bent, an optical axis is not bent in the camera apparatus. Accordingly, a quantity of light reaching each region of the sensor unit from the lens is uniformly distributed. Thus, a vignetting phenomenon does not occur in the camera apparatus. Therefore, the accuracy of an image signal can be improved in the camera apparatus.

Further, in the camera module and the camera apparatus having the same according to the embodiment, a light emitting part is directly mounted on the substrate so that the manufacturing cost can be reduced. That is, the sensor unit and the lens holder are disposed rearward of the substrate so that the lens may be closed to the substrate. Accordingly, even if the light emitting part is directly mounted on the substrate, an angle of view of the light emitting part can be ensured. For this reason, a separate sub-substrate for the light emitting part is unnecessary, so that a manufacturing cost of the camera apparatus can be reduced. Therefore, a cost of the camera apparatus can be reduced.

Further, in the camera module and the camera apparatus having the same according to the embodiment, the camera module is disposed rearward of the substrate as well as forward of the substrate, so an outer appearance design of the camera apparatus may be easily modified. That is, a part of the camera module is disposed forward of the substrate and a remaining part of the camera module is disposed rearward of the substrate so that the shape and the size of the camera apparatus may be modified. For example, the outer appearance design of the camera apparatus may be modified by suitably changing the shape and the size of the front housing or the shape and the size of the rear housing.

MODE FOR THE INVENTION

Hereinafter, exemplary embodiments will be described with reference to the accompanying drawings in detail. The same reference numbers are used throughout the drawings to refer to the same or like parts. Detailed descriptions of well-known functions and structures incorporated herein may be omitted when they make the subject matter unclear.

In the description of the embodiments, it will be understood that when each lens, unit, part, hole, protrusion, groove or layer is referred to as being "on" or "under" another lens, unit, part, hole, protrusion, groove or layer, it can be "directly" or "indirectly" on the other lens, unit, part, hole, protrusion, groove or layer or one or more intervening layers may also be present. Such a position has been described with reference to the drawings.

Figure 1:
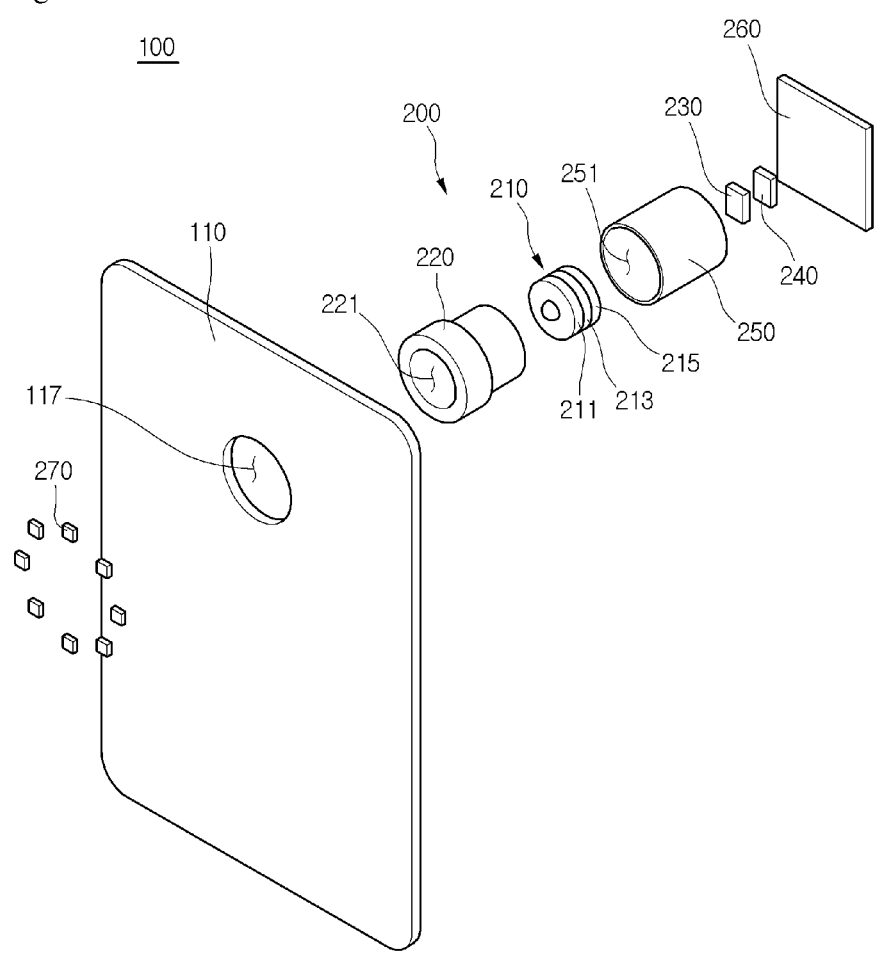
FIG. 1 is an exploded perspective view showing a camera apparatus according to the embodiment.
Figure 2:
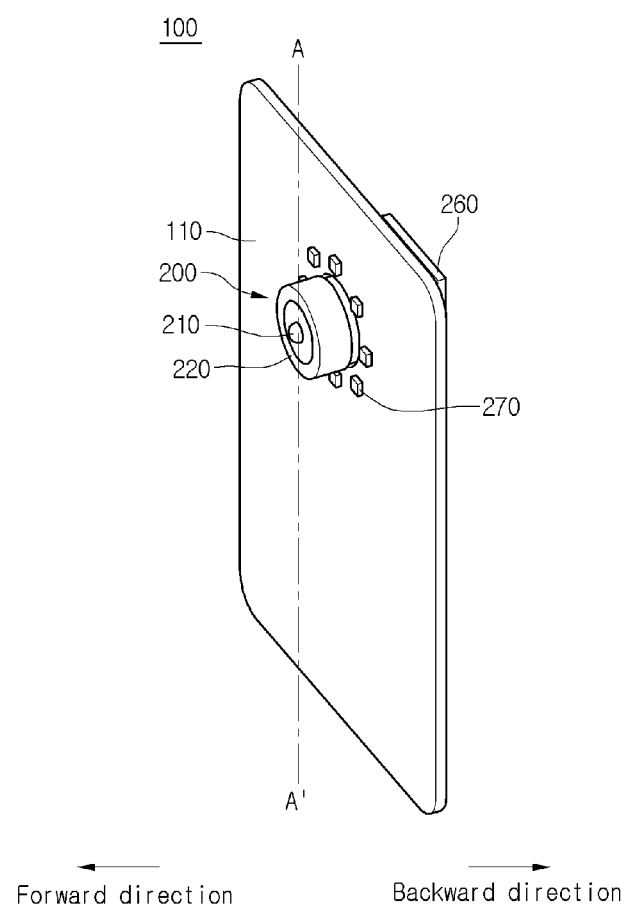
FIG. 2 is a perspective view showing a coupling state of a camera module according to the embodiment.
Figure 3:
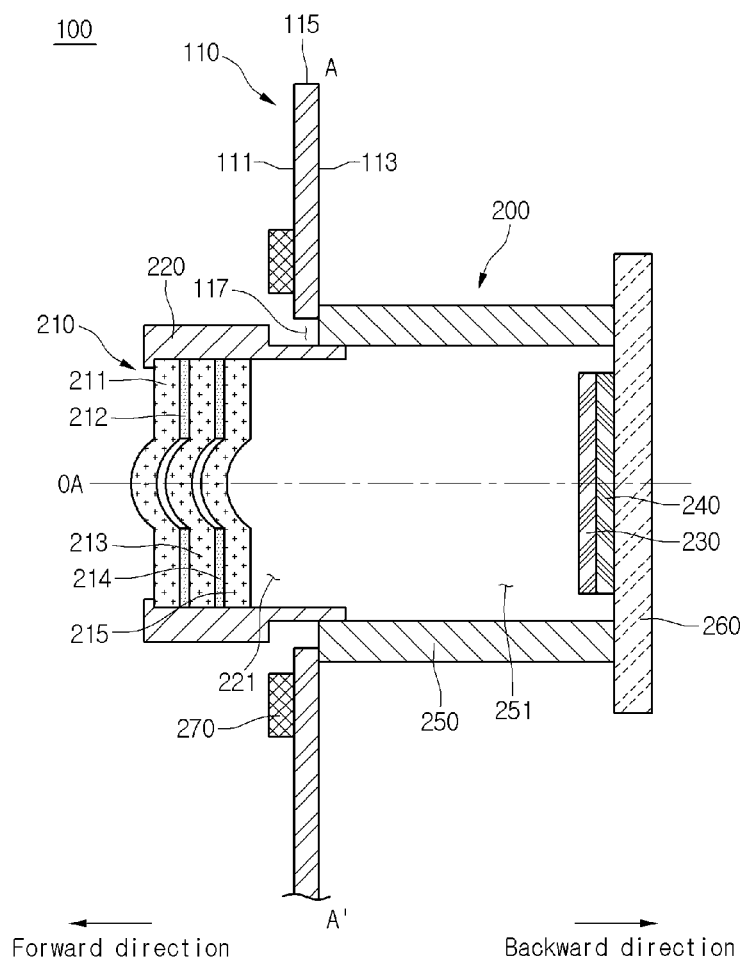
FIG. 3 is a sectional view taken along line A-A' of FIG. 2.

FIG. 1 is an exploded perspective view showing a camera apparatus according to the embodiment, FIG. 2 is a perspective view showing a coupling state of a camera module according to the embodiment, and FIG. 3 is a sectional view taken along line A-A' of FIG. 2.

Referring to FIGS. 1 to 3, the camera apparatus 100 according to the embodiment includes a substrate 110 and a camera module 200.

The substrate 110 is provided to control the overall operation of the camera apparatus 100. In this case, the substrate 110 drives the camera module 200. The substrate 110 may provide power to the camera module 200, and may transfer various control signals to the camera module 200. The substrate 110 fixes the camera module 200. The substrate 110 may include a Printed Circuit Board (PCB).

The substrate 110 includes a front surface 111, a back surface 113, and a lateral side 115. The front surface 111 is directed in the forward direction of the substrate 110. The back surface 113 is opposite to the front surface 111 and directed in the backward direction of the substrate 110. The lateral side 115 connects the front surface 111 to the back surface 113 at outer peripheries of the front surface 111 and the back surface 113. A hole 117 is formed in the substrate 110. In this case, the hole 117 extends through the front surface 111 and the back surface 113 at central regions of the front surface 111 and the back surface 113. The hole 117 may have a circle shape. The hole 117 may have a polygonal shape.

Meanwhile, although not shown in the drawing, at least one component may be mounted on the substrate 110. The component is mounted on at least one of the front surface 111 and the back surface 113 of the substrate 110. The component includes a central processing unit and a memory.

Further, the camera module 200 acquires an image signal under the control of the camera apparatus 100. In this case, the camera module 200 is driven by the substrate 110. That is, when power is supplied to the camera module 200, the camera module 200 is driven. Further, the camera module 200 operates as various control signals are applied thereto from the substrate 110.

The camera module 200 is mounted on the substrate 110. In this case, the camera module 200 passes through the substrate 110. That is, the camera module 200 extends through the front and rear portions of the substrate 110. The camera module 200 passes through the hole 117 of the substrate 110. In addition, the camera module 200 is disposed forward and rearward of the substrate 110. A part of the camera module 200 is disposed forward of the substrate 110, and the remaining part of the camera module 200 is disposed rearward of the substrate 110. Further, the camera module 200 is physically coupled with the substrate 110. The camera module 200 may be electrically connected to the substrate 110.

Further, the camera module 200 includes a lens assembly 210, a lens barrel 220, a filter unit 230, a sensor unit 240, a lens holder 250, a sensor substrate 260, and a light emitting part 270.

The lens assembly 210 is disposed forward of the substrate 110. The lens assembly 210 is disposed at a front end of the camera module 200. Light from the lens assembly 210 is incident into the camera module 200. The lens assembly 210 may have a circular shape or a rectangular shape.

The lens assembly 210 includes at least one lens 211, 213 and 215. In this case, when the lens assembly 210 includes a plurality of lenses 211, 213 and 215, the lenses 211, 213 and 215 are stacked in one direction. Further, the lens assembly 210 may further include at least one spacer 212 and 214. The spacers 212 and 214 may be individually disposed among the lenses 211, 213 and 215. The spacers 212 and 214 may keep the lenses 211, 213 and 214 to be spaced apart from each other.

The lens barrel 220 is disposed forward of the substrate 110. In this case, at least a part of the lens barrel 220 is disposed forward of the substrate 110. Further, the lens barrel 220 includes the lens assembly 210. In addition, light is incident into the lens assembly 210, and the lens barrel 220 exposes the lens assembly 210 so that light is output from the lens assembly 210.

A accepting hole 221 is formed in the lens barrel 220. Further, the lens barrel 220 includes the lens assembly 210 in the accepting hole 221. The lens barrel 220 accepts the lens assembly 210 inside the accepting hole 221 in one direction. Further, the lens barrel 220 exposes the lens assembly 210 through the accepting hole 221. The lens barrel 220 exposes the lens assembly 210 in both directions inside the accepting hole 221.

The filter unit 230 is disposed rearward of the substrate 110. Further, the filter unit 230 is disposed rearward of the lens barrel 220. In addition, the filter unit 230 filters the light incident from the lens assembly 210. In this case, the filter unit 230 may block infrared ray. That is, the filter unit 230 may block the light having long wavelength. The filter unit 230 can be formed by alternately depositing titanium oxide and silicon oxide on optical glass. The optical characteristic of the filter unit 230 to block the infrared ray may be adjusted depending on the thickness of the titanium oxide and silicon oxide.

The sensor unit 240 is disposed rearward of the substrate 110. Further, the sensor unit 240 is disposed rearward of the filter unit 230. The sensor unit 240 converts the light incident from the filter unit 230 into an electric image signal. The sensor unit 600 may include a CCD (charge coupled device) or a CMOS (complementary metal-oxide semi-conductor).

The lens holder 250 is disposed rearward of the substrate 110. In this case, at least a part of the lens holder 250 is disposed rearward of the substrate 110. Further, the lens holder 250 is disposed rearward of the lens barrel 220.

Further, the lens holder 250 is coupled with the lens barrel 220. In this case, the lens holder 250 may be coupled with the lens barrel 220 inside the hole 117 of the substrate 110. In addition, the lens holder 250 may be coupled with the lens barrel 220 in adjacent to the hole 117 at a front or a rear of the substrate 110. Further, the lens holder 250 is coupled with the substrate 110. That is, the lens holder 250 is coupled with at least one of the front surface 111 and the back surface 113 of the substrate 110 so that the camera module 200 is not moved in the forward direction or the backward direction of the substrate 110.

Further, the lens holder 250 accepts the filter unit 230 and the sensor unit 240. In this case, the filter unit 230 and the sensor unit 240 are spaced apart from the substrate 110 and the lens assembly 210 by the lens holder 250. The lens holder 250 may connect the filter unit 230 to the sensor unit 240. The filter unit 230 may be spaced apart from the sensor unit 240 by the lens holder 250. Further, the lens holder 250 exposes the filter unit 230 so that light from the lens assembly 210 is incident into the filter unit 230 and the sensor unit 240.

An exposure hole 251 is formed in the lens holder 250. The exposure hole 251 is connected to the accepting hole 221 of the lens barrel 220. The exposure hole 251 extends together with the accepting hole 221. Further, the lens holder 250 accepts the filter unit 230 and the sensor unit 240 inside the exposure hole 251. The lens holder 250 accepts the filter unit 230 and the sensor unit 240 in one direction. Further, the lens holder 250 exposes the filter unit 230 through the exposure hole 251. The lens holder 250 exposes the filter unit 230 toward the lens assembly 210 and the sensor unit 240.

The sensor substrate 260 is disposed rearward of the substrate 110. Moreover, the sensor substrate 260 is disposed rearward of the lens holder 250. In addition, the sensor substrate 260 is coupled with the lens holder 250. Furthermore, the sensor substrate 260 is coupled with the sensor unit 240. That is, the sensor unit 240 is mounted on the sensor substrate 260 so that the sensor substrate 260 fixes the sensor unit 240. The sensor substrate 260 includes a printed circuit board or a flexible printed circuit board (FPCB).

The sensor substrate 260 drives the sensor unit 240. In this case, the sensor substrate 260 may provide power to the sensor unit 240 and may transfer various control signals to the sensor unit 240. The sensor substrate 260 may be connected to the substrate 110 to drive the sensor unit 240 under the control of the substrate 110. Further, the sensor substrate 260 may transfer an electric image signal of the sensor unit 240 to the substrate 110.

The light emitting part 270 is disposed forward of the substrate 110. The light emitting part 270 is mounted at the front surface 111 of the substrate 110. Further, the light emitting part 270 is closed to the lens barrel 220. In addition, the light emitting part 270 is driven under the control of the substrate 110. That is, when power from the substrate 110 is supplied to the light emitting part 270, the light emitting part 270 is driven. Further, the light emitting part 270 receives various control signals from the substrate 110 and is operated according to the various control signals. In this case, the light emitting part 270 generates light. That is, the light emitting part 270 outputs the light in the forward direction. The light emitting part 270 may generate infrared ray (IR).

The light emitting part 270 may include at least one light emitting diode (LED). In this case, the LED may include an IR LED. In this case, when the light emitting part 270 includes a plurality of LEDs, the LEDs may be distributed based of the lens barrel 220. That is, the LEDs may surround the lens barrel 220. In other words, the LEDs may surround the lens assembly 210.

In this case, in the camera apparatus 100 according to the present invention, an optical axis (OA) connecting a center of the lens assembly 210 to a center of the sensor unit 240 is defined. Further, in the camera module 200, a distance between the lens assembly 210 and the sensor unit 240 is a focal length. As the camera module 200 passes through the substrate 110, a focal length is determined through the substrate 110. That is, the focal length is ranging from the front surface to the back surface of the substrate 110.

Meanwhile, although not shown in the drawing, the camera apparatus 100 further includes a housing. In this case, the housing accepts the substrate 110 and the camera module 200. The housing protects the substrate 110 and the camera module 200. In addition, the housing fixes and couples the substrate 110 and the camera module 200. The housing includes a front housing and a rear housing. The front housing is disposed forward of the camera module 200, and the rear housing is disposed rearward of the camera module 200. Further, the front housing is coupled with the rear housing so that an inner space is formed inside of the housing. In addition, the housing accepts the substrate 110 and the camera module 200 in the inner space.

According to the embodiment, the sensor unit 240 is disposed separately from the substrate 110 so that bending of the optical axis OA is suppressed at the camera apparatus 110. That is, even if the substrate 110 is bent, the optical axis OA is not bent. Accordingly, a quantity of light reaching each region of the sensor unit 240 from the lens assembly 210 is uniformly distributed. Thus, a vignetting phenomenon does not occur in the camera apparatus 100. Therefore, accuracy of an image signal may be improved in the camera apparatus 100.

Further, as the light emitting part 270 is directly mounted on the substrate 119, a manufacturing cost of the camera apparatus 100 may be reduced. That is, the sensor unit 240 and a lens holder 250 are disposed rearward of the substrate 110 so that the lens assembly 210 may be closed to the substrate 110. Accordingly, even if the light emitting part 270 is directly mounted on the substrate 110, an angle of view of the light emitting part 270 may be ensured. Therefore, since a separate sub-substrate is unnecessary for the light emitting part 270, a manufacturing cost of the camera apparatus 100 can be reduced. As a result, the cost of the camera apparatus 100 may be reduced.

Furthermore, the camera module 200 is disposed rearward of the substrate 110 as well as forward of the substrate 110 so that an outer appearance design of the camera apparatus 100 may be easily modified. That is, a part of the camera module 200 is disposed forward of the substrate 110 and a remaining part of the camera module 200 is disposed rearward of the substrate 110, so a shape and the size of the housing in the camera apparatus 100 may be modified. For example, at least one of the shape and the size of the front housing and the shape and the size of the rear housing is suitably changed so that the outer appearance design of the camera apparatus 100 may be modified.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A camera apparatus comprising:
   a main substrate mounted with at least one component;
   a camera module passing through the main substrate, and comprising a lens disposed forward of the main substrate and a sensor unit disposed rearward of the main substrate; and
   a light emitting part mounted at a front surface of the main substrate to generate light;
   wherein the camera module further comprises:
      a lens assembly disposed forward of the main substrate and comprising the lens;
      a sensor substrate to fix the sensor unit;
      a filter unit disposed rearward of the main substrate to filter light incident from the lens assembly;
      a sensor unit disposed rearward of the main substrate to convert the light incident from the filter unit;
      a lens barrel disposed forward of the main substrate to accept the lens assembly; and
      a lens holder coupled with the lens barrel, the main substrate, and the sensor substrate and disposed rearward of the main substrate to accept the sensor unit and the filter unit;
   wherein the light emitting part surrounds the lens barrel,
   wherein the sensor substrate is spaced apart from the main substrate by the lens holder,
   wherein a first end of a body of the lens holder is in direct physical contact with a rear surface of the main substrate such that the camera module is not moved in a forward direction or in a backward direction with respect to the main substrate,
   wherein a second end of the body of the lens holder is in direct physical contact with a front surface of the sensor substrate,
   wherein the main substrate is coupled on the first end of the body of the lens holder, and
   wherein front and rear surfaces of the light emitting part are disposed rearward of the lens assembly and forward of the sensor substrate, the sensor unit, the filter unit, and the lens holder.

2. The camera apparatus of claim 1, wherein at least a part of the lens barrel is disposed forward of the main substrate.

3. The camera apparatus of claim 1, where the main substrate comprises a hole and the camera module passes through the hole.

4. The camera apparatus of claim 1, wherein the light emitting part generates an infrared ray.

5. The camera apparatus of claim 1, wherein a distance between the lens and the sensor unit is a focal length extending through the main substrate.

6. A camera module comprising:
   a lens assembly disposed forward of a main substrate and comprising at least one lens;
   a lens barrel disposed forward of a main substrate that is mounted with at least one component, and comprising the lens assembly accepted therein;
   a lens holder coupled with the lens barrel and disposed rearward of the main substrate;
   a sensor unit accepted in the lens holder;
   a light emitting part mounted at a front surface of the main substrate to generate light; and
   a sensor substrate to fix the sensor unit,
   wherein the light emitting part surrounds the lens barrel,
   wherein the sensor substrate is spaced apart from the main substrate by the lens holder,
   wherein a first end of a body of the lens holder is in direct physical contact with a rear surface of the main substrate such that the camera module is not moved in a forward direction or in a backward direction with respect to the main substrate,
   wherein a second end of the body of the lens holder is in direct physical contact with a front surface of the sensor substrate,
   wherein the main substrate is coupled on the first end of the body of the lens holder, and
   wherein front and rear surface of the light emitting part are disposed rearward of the lens assembly and forward of the sensor substrate, the sensor unit, and the lens holder.

7. The camera module of claim 6, wherein the camera module extends through the main substrate by passing through a hole formed in the main substrate.

8. The camera module of claim 6, wherein at least a part of the lens barrel is disposed forward of the main substrate.

9. The camera module of claim 6, wherein the light emitting part generates an infrared ray.

10. The camera apparatus of claim 6, wherein a distance between the lens and the sensor unit is a focal length extending through the main substrate.

\* \* \* \* \*